United States Patent
Salkintzis

(10) Patent No.: US 12,041,466 B2
(45) Date of Patent: Jul. 16, 2024

(54) ANALYTICS-BASED POLICY GENERATION

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/315,493

(22) PCT Filed: Jul. 4, 2016

(86) PCT No.: PCT/EP2016/001142
§ 371 (c)(1),
(2) Date: Jan. 4, 2019

(87) PCT Pub. No.: WO2018/006924
PCT Pub. Date: Jan. 11, 2018

(65) Prior Publication Data
US 2019/0261199 A1    Aug. 22, 2019

(51) Int. Cl.
*H04W 24/02* (2009.01)
*H04W 24/08* (2009.01)
(Continued)

(52) U.S. Cl.
CPC .......... *H04W 24/02* (2013.01); *H04W 24/08* (2013.01); *H04W 28/0215* (2013.01);
(Continued)

(58) Field of Classification Search
None
See application file for complete search history.

(56) References Cited

U.S. PATENT DOCUMENTS

| | | | |
|---|---|---|---|
| 9,854,450 B2 * | 12/2017 | Abdullah | H04W 4/02 |
| 2007/0026853 A1 * | 2/2007 | Stevens | H04W 24/02 |
| | | | 455/423 |

(Continued)

FOREIGN PATENT DOCUMENTS

| | | | |
|---|---|---|---|
| EP | 2093890 A1 | 8/2009 | |
| EP | 2523496 A1 | 11/2012 | |
| EP | 2525614 A1 * | 11/2012 | H04W 68/04 |

OTHER PUBLICATIONS

PCT/EP2016/001142, "Notification of Transmittal of the International Search Report and the Written Opinion of the International Searching Authority, or the Declaration", Patent Cooperation Treaty, Mar. 20, 2017, pp. 1-15.

(Continued)

*Primary Examiner* — Kenny S Lin
*Assistant Examiner* — Rodrick Mak
(74) *Attorney, Agent, or Firm* — Kunzler Bean & Adamson

(57) ABSTRACT

Apparatuses, methods, and systems are disclosed for analytics-based policy generation. One apparatus (500) includes a processor (505) and a radio transceiver (525) that communicates over a mobile communication network. The processor (505) receives a request from the mobile communication network to report at least one type of usage data according to a reporting policy, the at least one type of usage data including battery usage data and/or network location data. The processor (505) transmits (710) a usage report (225) containing the usage data based on the reporting policy. The processor (505) further receives (715) and applies (720) a network policy (240) from the mobile communication network. The network policy (240) is dynamically generated by the mobile communication network based on at least one trend identified in the usage data.

20 Claims, 7 Drawing Sheets

(51) Int. Cl.
*H04W 28/02* (2009.01)
*H04W 28/10* (2009.01)
*H04W 28/18* (2009.01)

(52) U.S. Cl.
CPC ....... *H04W 28/0268* (2013.01); *H04W 28/10* (2013.01); *H04W 28/18* (2013.01)

(56) References Cited

U.S. PATENT DOCUMENTS

| | | | | |
|---|---|---|---|---|
| 2012/0060198 | A1* | 3/2012 | Tremblay | H04M 15/66 726/1 |
| 2014/0045529 | A1* | 2/2014 | Bolon | H04W 24/08 455/456.1 |
| 2014/0155109 | A1* | 6/2014 | Vaidya | H04W 8/06 455/458 |
| 2014/0179357 | A1* | 6/2014 | Salvador | H04W 68/04 455/458 |
| 2014/0241156 | A1 | 8/2014 | Cha | |
| 2014/0380025 | A1* | 12/2014 | Kruglick | G06F 15/7807 712/220 |
| 2015/0056960 | A1 | 2/2015 | Egner et al. | |
| 2015/0103371 | A1* | 4/2015 | Bubbio | G06Q 20/3224 358/1.15 |
| 2015/0148041 | A1* | 5/2015 | Ozkan | H04W 8/18 455/436 |
| 2015/0180746 | A1* | 6/2015 | Day, II | H04L 51/16 455/405 |
| 2015/0201400 | A1* | 7/2015 | Yin | H04W 68/02 370/329 |
| 2015/0249932 | A1* | 9/2015 | Racz | H04W 24/10 370/252 |
| 2016/0088509 | A1* | 3/2016 | Jain | H04W 24/10 370/252 |
| 2016/0112844 | A1 | 4/2016 | Boothroyd et al. | |
| 2016/0277953 | A1* | 9/2016 | Andersson | H04L 41/12 |
| 2016/0337389 | A1* | 11/2016 | Letal | G06Q 50/01 |
| 2017/0070923 | A1* | 3/2017 | Li | H04W 36/0066 |
| 2017/0142766 | A1* | 5/2017 | Kim | H04W 48/20 |
| 2017/0195182 | A1* | 7/2017 | Nair | H04L 41/0816 |
| 2017/0280340 | A1* | 9/2017 | Zhu | H04W 24/04 |
| 2018/0262924 | A1* | 9/2018 | Dao | H04W 72/1257 |
| 2019/0082316 | A1* | 3/2019 | Peng | H04W 8/02 |
| 2020/0196159 | A1* | 6/2020 | Tellado | H04W 36/14 |

OTHER PUBLICATIONS

G. Finnie, "Policy as a Platform: Delivering Agility & Simplicity", Cisco Heavy Reading, November, http://www.cisco.com/c/dam/en/us/solutions/collateral/service-provider/policy-charging-control/agility-with-policy.pdf, Nov. 2014, pp. 1-13.

* cited by examiner

ANALYTICS-BASED POLICY GENERATION

FIELD

The subject matter disclosed herein relates generally to wireless communications and more particularly relates to dynamic, analytics-based policy generation at a mobile communication network.

BACKGROUND

The following abbreviations are herewith defined, at least some of which are referred to within the following description.
  3GPP Third Generation Partnership Project
  4G Fourth Generation
  5G Fifth Generation
  AP Access Point
  DL Downlink
  eNB Evolved Node B
  EPC Evolved Packet Core
  LAN Local Area Network
  LTE Long Term Evolution
  MME Mobility Management Entity
  OFDM Orthogonal Frequency Division Multiplexing
  PGW Packet Data Network Gateway
  PLMN Public Land Mobile Network
  RAN Radio Access Network
  SC-FDMA Single Carrier Frequency Division Multiple Access
  SGW Serving Gateway
  UE User Entity/Equipment (Mobile Terminal)
  UL Uplink
  WiMAX Worldwide Interoperability for Microwave Access In wireless communications networks, network policies are used to enforce specific rules. Fourth-generation ("4G") mobile networks support static policy rules, such as throttling data rates at specific times, blocking certain traffic (e.g., to specific networks/domains), charging at a reduced rate, and assigning specific QoS levels to specific classes of subscribers (e.g., gold-level users).

BRIEF SUMMARY

Apparatuses for analytics-based policy generation are disclosed. Methods and systems also perform the functions of the apparatus. In one embodiment, an apparatus for analytics-based policy generation includes a processor and a network interface that communicates with a remote unit. The processor requests the remote unit to report at least one type of usage data according to a reporting policy, the at least one type of usage data including one of battery usage data and network location data. The processor receives a usage report from the remote unit, the usage report including usage data of the at least one type of usage data. The processor further determines an analytics record for the remote unit. The analytics record indicates at least one trend based on the usage report and a confidence level for each trend. The processor dynamically generates a network policy in response to a confidence level exceeding a predetermined threshold, the network policy being based on usage data underlying the trend. The processor also controls the network interface to send the network policy one of the remote unit and a network function.

In certain embodiments, the processor further receives a network report for the remote unit, wherein the analytics record for the remote unit further indicates at least one trend based on the network report. In such embodiments, the network report may include data selected from the group consisting of: handover history of the remote unit, traffic type history, and data consumption history of the remote unit.

In some embodiments, the apparatus includes a storage device that stores the received usage reports as usage history, wherein the processor determines the at least one trend using the stored usage history. In one embodiment, the at least one identified trend is a pattern of battery consumption at a particular time period. In such an embodiment, the network policy indicates one or more of a quality of service policy, a routing policy, and a media codec to be utilized at the particular time period.

In certain embodiments, the at least one identified trend is a pattern of remote unit movement at a particular time period and the network policy indicates a one or more of a paging policy and a mobility management policy to be utilized at the particular time period. In one embodiment, the at least one identified trend indicates a pattern of media streaming in a particular time period and the network policy indicates a quality of service to be utilized at the particular time period.

In some embodiments, the reporting policy indicates whether the remote unit is to transmit a usage report based on one or more of a charging state of the remote unit, a battery level of the remote unit, a network connection type of the remote unit, a usage report size, and a predetermined time interval.

In one embodiment, a method for analytics-based policy generation includes requesting a remote unit to report at least one type of usage data according to a reporting policy, the at least one type of usage data including one of battery usage data and network location data. The method includes receiving a usage report from the remote unit, the usage report including usage data of the at least one type of usage data. The method further includes determining an analytics record for the remote unit, the analytics record indicating at least one trend based on the usage report and a confidence level for each trend. The method includes generating a network policy in response to a confidence level exceeding a predetermined threshold, the network policy being based on usage data underlying the trend. The method also includes transmitting the network policy to one of the remote unit and a network function.

In certain embodiments, the method includes receiving a network report for the remote unit, wherein the analytics record for the remote unit further indicates at least one trend based on the network report. In such embodiments, the network report includes data selected from the group consisting of: handover history of the remote unit, traffic type history, and data consumption history of the remote unit.

In some embodiments, the method includes storing received usage reports as usage history at a storage device, wherein determining an analytics record for the remote unit is further based on the stored usage history. In one embodiment, the at least one identified trend is a pattern of battery consumption at a particular time period. In such an embodiment, the network policy indicates one or more of a quality of service policy, a routing policy, and a media codec to be utilized at the particular time period.

In certain embodiments, the at least one identified trend is a pattern of remote unit movement at a particular time period and the network policy indicates one or more of a paging policy and a mobility management policy to be utilized at the particular time period. In one embodiment, the at least one identified trend indicates a pattern of media streaming in a particular time period and the network policy indicates a quality of service to be utilized at the particular time period. In some embodiments, the reporting policy indicates whether the remote unit is to transmit a usage report based on one or more of a charging state of the remote unit, a battery level of the remote unit, a network connection type of the remote unit, a usage report size, and a predetermined time interval.

Another apparatus for analytics-based policy generation includes a processor and a radio transceiver that communicates over a mobile communication network. The processor receives a request from the mobile communication network to report at least one type of usage data according to a reporting policy, the at least one type of usage data including battery usage data and/or network location data. The processor transmits a usage report containing the usage data according to the reporting policy. The processor further receives and applies a network policy from the mobile communication network. The network policy is dynamically generated by the mobile communication network associated with at least one trend identified in the usage data.

In certain embodiments, the reporting policy indicates whether the apparatus is to transmit a usage report based on a charging state of the apparatus, a battery level of the apparatus, a network connection type of the apparatus a usage report size, and/or a predetermined time interval. In one embodiment, the network location data includes at least one of cells visited while in an idle mode and wireless local area network connection history. In another embodiment, the battery usage data includes battery level data, battery consumption rate data, and charging history.

In some embodiments, the at least one identified trend is a pattern of battery consumption at a particular time period. In such embodiments, the network policy may indicate a quality of service policy, a routing policy, and/or a media codec to be utilized at the particular time period. In one embodiment, the at least one identified trend is a pattern of movement by the apparatus at a particular time period and the network policy includes a routing policy that indicates a base unit to connect with at the particular time period. In another embodiment, the at least one identified trend is a pattern of media streaming at a particular time period and the network policy indicates a quality of service to be utilized at the particular time period. In certain embodiments, the network policy has a validity period, wherein the apparatus applies the network policy during the validity period.

Another method for analytics-based policy generation includes receiving a request from the mobile communication network to report at least one type of usage data according to a reporting policy, the at least one type of usage data including one of battery usage data and network location data. The method also includes transmitting by a remote unit, according to the reporting policy, a usage report containing the usage data. The method further includes receiving and applying a network policy from the mobile communication network. The network policy is dynamically generated by the mobile communication network associated with at least one trend identified in the usage data.

In certain embodiments, the reporting policy indicates whether the remote unit is to transmit a usage report based on one or more of a charging state of the remote unit, a battery level of the remote unit, a network connection type of the remote unit, a usage report size, and a predetermined time interval. In one embodiment, the network location data includes at least one of cells visited while in an idle mode and wireless local area network connection history. In another embodiment, the battery usage data includes battery level data, power consumption rate data, and charging history.

In some embodiments, the at least one identified trend is a pattern of battery consumption at a particular time period. In such embodiments, the network policy indicates one or more of a quality of service policy, a routing policy, and a media codec to be utilized at the particular time period. In one embodiment, the at least one identified trend is a pattern of remote unit movement at a particular time period and the network policy includes a routing policy that indicates a base unit to connect with at the particular time period. In another embodiment, the at least one identified trend is a pattern of media streaming at a particular time period and the network policy indicates a quality of service to be utilized at the particular time period. In certain embodiments, the network policy has a validity period, wherein applying the network policy includes applying the network policy during the validity period.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
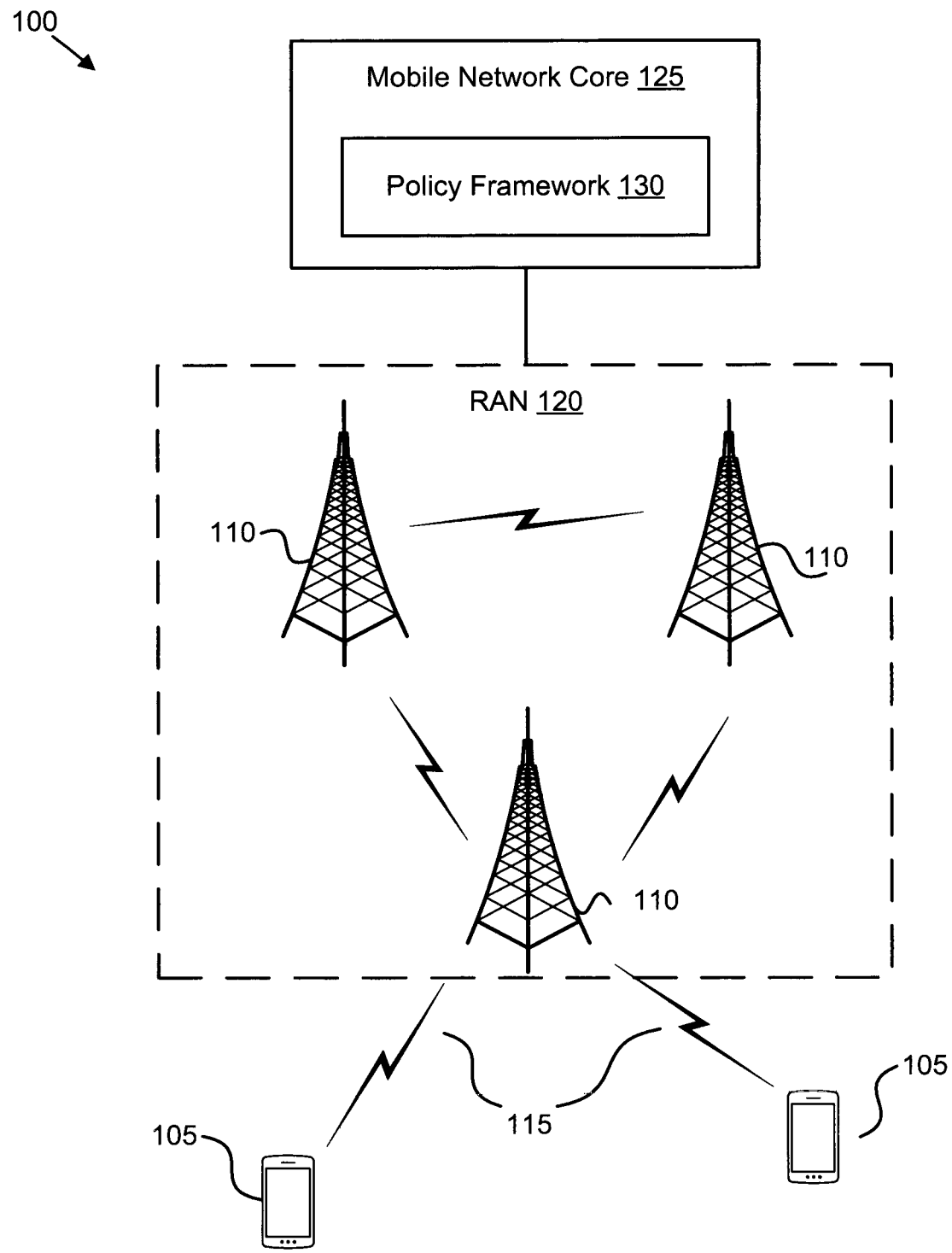
FIG. 1 is a schematic block diagram illustrating one embodiment of a wireless communication system for analytics-based policy generation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to support dynamic policy creation and analytics-based policies in fifth-generation ("5G") networks a new functional element is disclosed within the policy framework, referred to as a "Analytics Function". The analytics function takes measurements, referred to as usage reports, from the UE and from various network functions. The analytics function applies analytics techniques to process these measurements and derive meaningful trends or patterns describing the behavior of users and their devices. Then, using the meaningful trends and patterns, the policy framework dynamically generates trend-specific network policies for optimizing performance and/or user experience based on the usage data underlying the derived trends/patterns. The UE and/or other network functions then receive and implement the dynamically-generated network policies.

FIG. 1 depicts an embodiment of a wireless communication system 100 for analytics-based policy generation. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

The base units 110 may be distributed over a geographic region. In certain embodiments, a base unit 110 may also be referred to as an access point ("AP"), an access terminal, a base, a base station, a Node-B, an eNB, a Home Node-B, a relay node, a device, or by any other terminology used in the art. The base units 110 are generally part of a radio access network ("RAN") 120 that may include one or more controllers communicably coupled to one or more corresponding base units 110. These and other elements of radio access network are not illustrated but are well known generally by those having ordinary skill in the art.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 may communicate with one or more of the remote units 105 and/or one or more of the base units 110.

The base units 110 connect to the mobile network core 125 via the RAN 120. In one embodiment, the mobile network core 125 is a 5G (also referred to as "NextGen") packet core or the evolved packet core ("EPC") specified in LTE specifications, which may be coupled to other networks, like the Internet and private data networks, among other data networks. The present disclosure is not intended to be limited to the implementation of any particular wireless communication system architecture or protocol. Thus, in a non-LTE implementation, the base units 110 may be coupled to a non-EPC type of packet core network, such as to a "5G" packet core network. The depicted mobile network core 125 includes a policy framework 130, discussed in further detail with reference to FIG. 2. The mobile network core 125 may include controllers and gateways, which are not illustrated, but are known generally by those having ordinary skill in the art. For example, one or more base units 110 may be communicably coupled to a mobility management entity ("MME"), a serving gateway ("SGW"), and/or a packet data network gateway ("PGW"). Further, the wireless communication system 100 may include any number of mobile network cores 125.

In one implementation, the wireless communication system 100 is compliant with the long-term evolution ("LTE") of the 3GPP protocol, wherein the base units 110 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In certain embodiments, a remote unit 105 is configured to report at least one type of usage data to the policy framework 130 according to a reporting policy. The reporting policy dictates when the remote unit 105 is to transmit collected usage data of the at least one type of usage data. In one embodiment, the policy framework 130 instructs the remote unit 105 what types of usage data to collect and when to report the usage data. The policy framework 130 analyzes the usage data to determine one or more trends and/or patterns for users (e.g., subscribers of the PLMN to which the policy framework 130 belongs). The trends and/or patterns may then be used by the policy framework 130 to dynamically generate analytics-based policy rules. These dynamically-generated policy rules (referred to herein as "network policies") are advanced policy rules that enhance the user experience and improve network performance. The policy framework 130 dynamically generates these policy rules based on analytics results that statistically describe the behavior of the remote units 105.

As an example of an advanced policy rule, the policy framework 130 may create a paging policy so that from 9 AM to 5 PM, the RAN 120 pages a certain remote unit 105 only in a specific cell (rather than a group of cells). This policy may be based on analytic reports which consider the mobility patterns of the remote unit 105 and determine that, with a high probability, remote unit 105 is located in the specific cell between the hours of 9 AM and 5 PM on weekdays. As another example of an advanced policy rule, the policy framework 130 may create a policy to apply power-efficient voice coding to all voice calls of a particular remote unit 105 between 6 PM and 8 PM. This policy may be based on analytic reports which consider the battery consumption patterns of the remote unit 105 and suggest that, with a high probability, the battery of the remote unit 105 is running low everyday between 6 PM and 8 PM.

Figure 2:
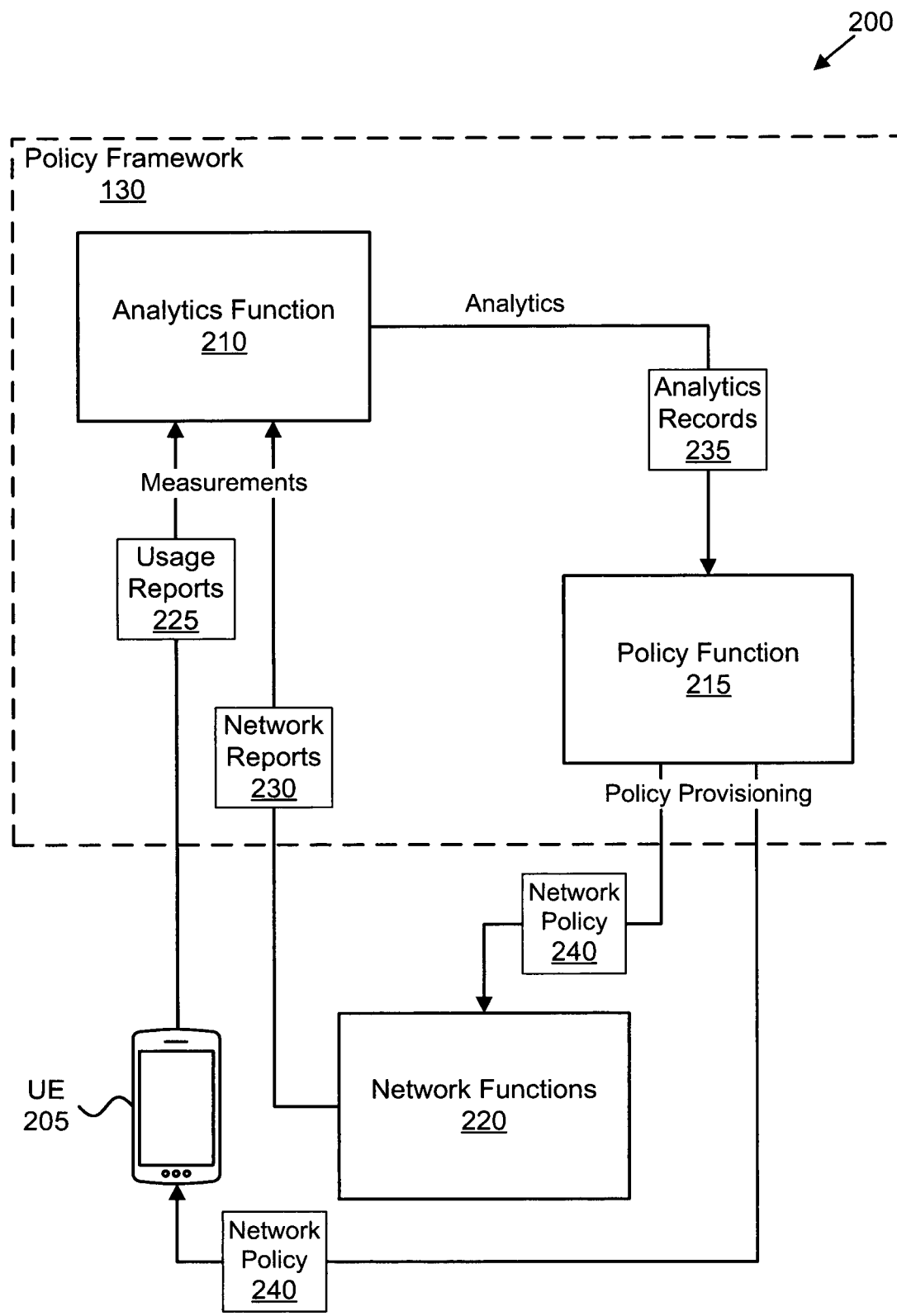
FIG. 2 illustrates one embodiment of a network architecture for analytics-based policy generation.

FIG. 2 depicts a network architecture 200 used for analytics-based policy generation, according to embodiments of the disclosure. The network architecture 200 includes a UE 205, a policy framework 130 that includes both an analytics function 210 and a policy function 215, and network functions 220. In one embodiment the network functions 220 contain one or more user-plane elements, such as a serving gateway ("SGW") and/or a packet data network gateway ("POW"). The UE 205 may be one embodiment of a remote unit 105, described above with reference to FIG. 1. The analytics function 210 receives measurements from the UE 205 and the network functions 220 (e.g., receives usage reports and network reports) and derives analytic reports (analytics records 235) which are forwarded to the policy function 215. In an alternative embodiment, the analytics function 210 stores the derived analytic report in a data storage and the policy function 215 retrieves these reports from the data storage whenever the policy function 215 attempts to generate new network policies. The policy function 215 dynamically generates network policies from the analytic reports and provisions both the UE 205 and the network functions 220 with the analytics-based network policies. In some embodiments, the policy function 215 optionally generated policies using additional information from the other functions, such as online charging system, offline charging system, billing functions, and the like (not shown).

The UE 205 collects usage data (measurements) and forwards this data to the analytics function 210 as usage reports 225. In one embodiment, the UE 205 does not send usage data in real-time. Rather, usage data is internally collected in the UE and sent to the analytics function 210 in batches. For example, the UE 205 may send a batch of usage data to the analytics function 210 every X hours, where the value X is specified by the mobile communication network.

Examples of usage data provided by the UE 205 include battery level of the UE 205 (e.g., tracking battery level over time), battery consumption rate of the UE 205 (e.g., tracking battery consumption rate over time), software applications used by the UE 205 (either identifying applications by category or using application-specific identifiers), network location of the UE 205 (e.g., cells visited while in idle mode and/or WLAN connection history), physical location and/or speed of the UE 205 (e.g., tracking movement over time), charging times, and the like. Note that the collected usage data is different from radio measurements conventionally reported by the UE 205. Additionally, the collected usage data differs from the data collected for mobile application analytics. While data collected for mobile application analytics relates to how mobile applications are utilized (e.g., how users interact with the mobile applications), the collected usage data described herein relates to battery usage (e.g., battery level data, battery consumption rate data, and/or charging history), network locations (e.g., cells visited while in an idle mode and/or WLAN connection history), and other data usable by the mobile communication network to optimize network performance and enhance user experience.

The policy framework 130 includes an analytics function 210 and a policy function 215. While depicted as separate entities, in other embodiments the analytics function 210 and policy function 215 may describe different functions of the same network entity. For example, the analytics function 210 may be an add-on to an existing policy function 215.

The analytics function 210 is a functional element within the policy framework that collects measurements from the UE 205 and from various network functions 220. The analytics functions 210 may be implemented as a hardware circuitry, as software (e.g., computer program code), or as a combination of hardware circuitry and software. In one embodiment, separate interfaces are used to collect measurements from the UE 205 (e.g., usage reports 225) than are used to collect measurements from the network functions 220 (e.g., network reports 230). The analytics function 210 operates on the measurements to identify one or more trends describing behaviors of users and their devices. For example, the analytics function 210 may identify a pattern of user activity/behavior correlated with a particular time period. As another example, the analytics function 210 may identify a pattern of network activity/behavior correlated with a particular time period. The analytics function 210 may determine whether the identified patterns are statistically significant descriptors of behavior of mobile users.

The analytics function 210 generates one or more analytics records 235 that indicate meaningful (e.g., statistically significant) patterns or trends for users of the mobile communication network. An analytics record 235 may include a user-specific analysis and/or a network-specific analysis. Examples of user-specific trends in an analytics record 235 include: the battery level of the UE 205 consistently dropping to 20% or below during a particular time frame (e.g., 5 PM to 8 PM), the user consistently using video streaming services during a particular time frame (e.g., 9 PM to 10 PM), a path of travel (e.g., described using physical and/or network locations) by the user on weekdays, a WLAN AP or cellular base station that the UE 205 is connected to during evening/night hours (e.g., from 8 PM to 6 AM), and the like. Examples of network-specific trends in an analytics record 235 include: radio resource utilization in a particular cell exceeding a threshold level (e.g., 90%) during a specific time frame (e.g., 6 AM to 9 AM), traffic rates in a particular area exceeding a threshold rate (e.g., 100 Mbps) for e.g., 95% of the time during a specific time frame (e.g., 8 AM to 10 AM), and the like. The analytic function 210 transmits the analytics records 235 to the policy function 215.

The policy function 215 is a functional element within the policy framework that generates network policies 240 and provisions the UE 205 and/or the network functions 220 with the network policies 240 (e.g., sends the network policies 240 to the UE 205 and/or the network functions 220). The UE 205 and/or the network functions 220 then implement the network policies 240. The network policies 240 may relate to QoS levels, routing, paging, media codecs, and the like. The policy function 215 may be implemented as a hardware circuitry, as software (e.g., computer program code), or as a combination of hardware circuitry and software. As discussed above, the policy function 215 receives analytics records 235 from the analytics function 210. Where the analytics function 210 identifies meaningful trends in user behavior (e.g., as indicated in the analytics records 235), the policy function 215 dynamically generates network policies 240 to improve network performance and the user experience.

As used herein, meaningful trends refer to trends usable to predict user behavior with a high degree of confidence. In some embodiments, each trend reported in an analytics record 235 includes a confidence level calculated by the analytics function 210. The confidence level is a measure of certainty and indicates a likelihood of the trend predicting future behavior. The policy function 215 will act on a trend (e.g., generate a network policy 240 to optimize network performance based on the usage data underlying the trend) when the confidence level corresponding to the trend exceeds a predetermined confidence threshold. For example, trends may be detected by an analysis of one or more analytics records 235, and a suitable network policy 240 generated when the confidence level reaches a predefined level. In one embodiment, the confidence threshold is a global value (e.g., equally applicable to all trends). In another embodiment, the confidence threshold may differ according to a type of trend (e.g., user-specific or network-specific), a type of usage data used to determine the trend, or other suitable criteria.

As an example, where the identified meaningful trend is a pattern of battery consumption at a particular period of time indicating that the battery level goes low at a particular period, the policy function 215 may generate a network policy 240 indicating a QoS policy that reduces traffic delay during the particular period of time, a routing policy for the particular period of time that optimizes battery life, a power-efficient media codec to be utilized at the particular period of time, or the like. As another example, where the identified meaningful trend is a pattern of movement at a particular period of time, the policy function 215 may generate a network policy 240 indicating a paging policy and/or a mobility management policy to be utilized at the particular period of time. As yet another example, where the identified meaningful trend is a pattern of media streaming in a particular period of time indicating when the UE 205 utilizes media streaming services, the policy function 215 may generate a network policy 240 indicating a QoS policy and/or media codec policy to be utilized at the particular period of time in order to optimize the media streaming experience. In one embodiment, the network policy 240 has a validity period, wherein the UE 205 and/or the network functions 220 apply (implement) the network policy 240 during the validity period.

The network functions 220 are representative of various network entities in the mobile network core 125 and/or RAN 120 that gather and send network usage data (measurements) to the analytics function 210 in the form of network reports 230. The analytics function 210 uses the network reports 230 in combination with the usage reports 225 to predict user behavior. The network functions 220 may also receive and implement the analytics-based network policies 240 generated by the policy function 215 in response to trends detected by the analytics function 210.

In some embodiments, a network function 220 may perform deep packet inspection of data traffic of the UE 205 (e.g., examining the data payload of a packet) to determine when the UE 205 is used for video streaming, audio streaming, and the like. The inspecting network function (e.g., a PGW) may report the deep packet inspection data to the analytics function 210, wherein the analytics function 210 determines patterns and/or trends of media streaming activity by a user of the UE 205 using both the deep packet inspection data and the usage data. Additionally, the network functions 220 may report handover events, radio site utilization (loading) rates, and the like. The network reports 230 may be used to identify network-specific trends. The network reports 230 may also be used in combination with the usage reports 225 to identify user-specific behavior (e.g., such as consistently using video streaming services during a particular time period).

Figure 3:
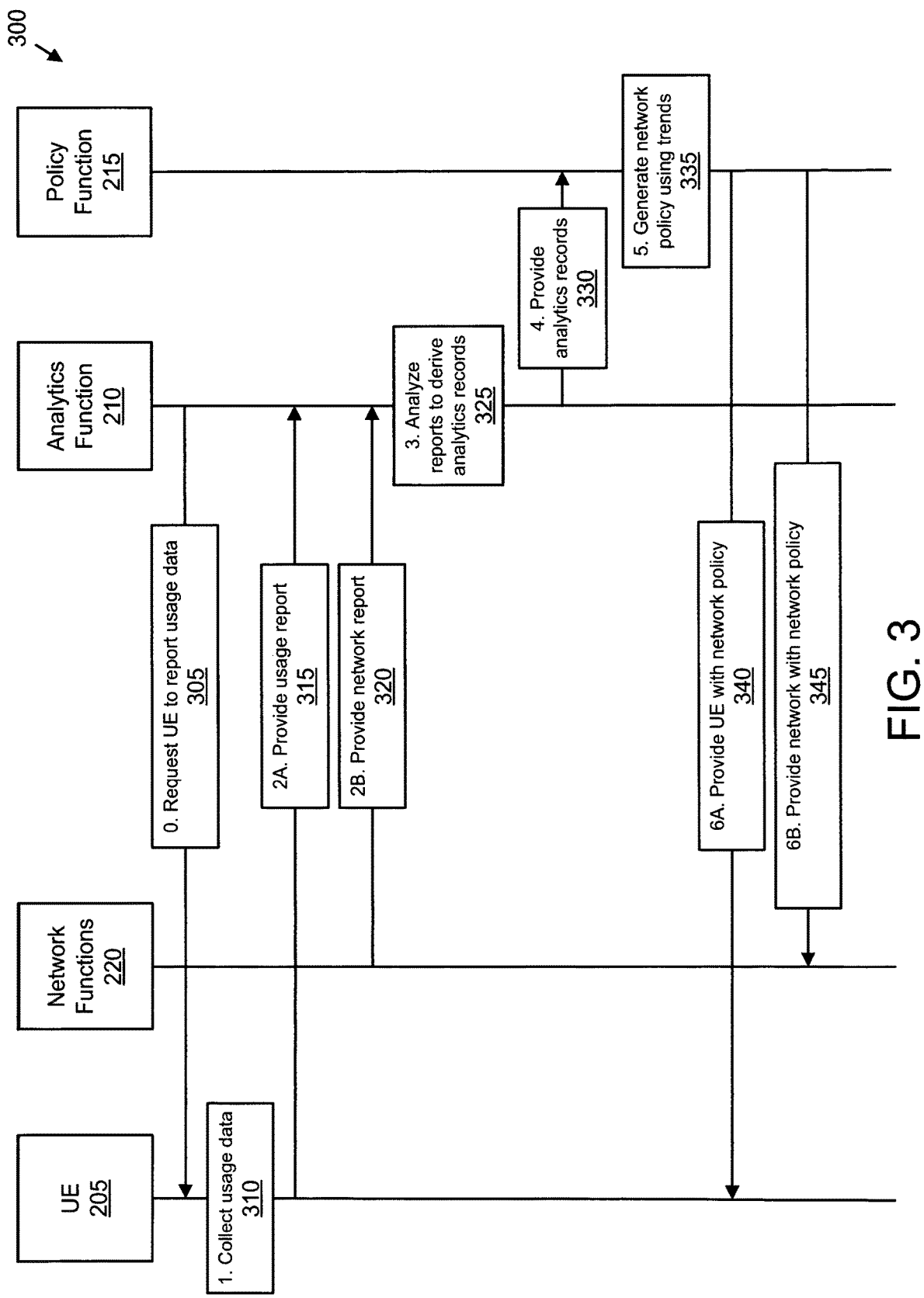
FIG. 3 illustrates one embodiment of an analytics-based policy generation procedure.

FIG. 3 is a diagram illustrating an analytics-based policy generation procedure 300, according to embodiments of the disclosure. The policy generation procedure 300 depicts actions performed by and communications among the UE 205, the analytics function 210, the policy function 215, and the network functions 220. The UE 205, the analytics function 210, the policy function 215, and the network functions 220 are substantially as described above with reference to FIG. 2.

Initially, the UE 205 received a request 305 to collect and report usage data to the analytics function 210. As depicted, the analytics function 210 sends the request to the UE 205. The analytics function 210 indicates the types of usage data the UE 205 is to collect/report and provides a reporting policy for when the UE 205 is to report the usage data. As described above, the UE 205 compiles the usage data to send in batches, rather than transmitting the usage data in real-time. A batch of usage data is referred to as a "usage report."

Based on the instructions from the network (e.g., the analytics function 210) the UE 205 collects 310 usage data. The UE 205 then compiles the usage data to provide 315 a usage report (e.g., usage report 225) to the analytics function 210.

In one embodiment, the reporting policy dictates periodic reporting such that the UE 205 transmits 315 a usage report 225 at a regular interval. In another embodiment, the reporting policy may indicate one or more conditions to be met before transmitting 315 the usage report 225. Examples of conditions to be met include one or more of: transmitting 315 a usage report 225 when the battery level exceeds a certain level, transmitting 315 a usage report 225 when the UE 205 is being charged, transmitting 315 a usage report 225 when the UE 205 is connected to a WLAN or other unmetered network, transmitting 315 a usage report 225 when the amount of collected usage data (e.g., usage report size) exceeds a threshold amount, and the like. An exemplary usage report is described with reference to FIG. 4.

Additionally, the network functions 220 may provide 320 one or more network reports (e.g., network reports 230) to the analytics function 210. In one embodiment, the network report 230 relates to the UE 205. For example, the network report 230 may indicate a radio recirculation rate of a cell frequented by the UE 205 and/or traffic rates of an area frequented by the UE 205. The network report 230 may include handover history of the UE 205, traffic type history of the UE 205, data consumption history of the UE 205, and the like. In one embodiment, the network functions 220 are also provisioned with a reporting policy, which may or may not be the same as the reporting policy provisioned to the UE 205. In other embodiments, the network functions 220 provide 320 network reports 230 at regular intervals.

The analytics function 210 stores the receive reports 225-230 as usage history and analyzes 325 the reports 225-230 to derive one or more analytics records 235 pertaining to the UE 205. The analytics function 210 may analyze 325 all stored reports 225-230, rather than the most recent reports 225-230. However, greater weight to be given to more recent data (measurements). The analytics records 235 indicate at least one trend based on the usage history (the usage reports 225 and/or network reports 230). The analytics function 210 may use various data analysis techniques to derive the analytics records 235 from the reports 225-230. Additionally, the analytics records 235 include a confidence level for each trend included. The trends relate to behavior of the UE 205 and are usable to predict future activity of the UE 205.

Examples of analytics records 235 derived by the analytics function 210 include the following: "From 5 PM to 8 PM battery drops to 20% or below;" "Video streaming is used from 9 PM to 10 PM;" "On weekdays the location of the device follows the same path X;" "Device is connected to WLAN SSID-x from 8 PM to 6 AM;" and "Device is located in cell-x from 10 AM to 2 PM." As discussed above, each item (also referred to as "trend") in the analytics record 235 may be associated with a confidence level. The analytics function 210 provides 330 the analytics record(s) 235 to the policy function 215.

The policy function 215 dynamically generates 335 one or more network policies (e.g., network policies 240) in response to the trends identified by the analytics function 210. The policy function 215 may generate 335 a network policy 240 addressing an identified trend in response to the trend's confidence level exceeds a confidence threshold (e.g., 85%). The network policy 240 may be based on the usage data underlying the identified trend, where the trend may be identified through analysis of the analytics records 235. The policy function 215 then provides the UE 205 and/or network functions 220 with the analytics-based network policy 240 (items 340-345). In one embodiment, the network policy 240 has a validity period, wherein the one of the remote unit 105 and a network function 220 applies the network policy during the validity period.

As an example, in response to the reported trend "From 5 PM to 8 PM battery drops to 20% or below," the policy function 215 may address the trend by creating a routing policy (assuming the confidence value of this trend is sufficiently large) that steers video sessions established by the UE 205 between the hours of 5 PM and 8 PM to a video transcoder that applies power-efficient video coding, rather than state-of-the-art codecs (e.g., H.264/AVC or HEVC) which suffer from very high complexity and thus can consume larger amounts of battery of the UE 205. Similarly, the policy function 215 may address the trend by creating a codec policy to utilize power-efficient voice codecs for voice sessions established by the UE 205 between the hours of 5 PM and 8 PM. In addition, the policy function 215 may address the trend by creating a new QoS policy between the hours of 5 PM and 8 PM to apply higher scheduling priority to data traffic of the UE 205, so that data transfer delay (and hence battery consumption) is minimized.

As another example, in response to the reported trend "Device is located in cell-x from 10 AM to 2 PM," the policy function 215 may address the trend by creating a paging policy so that the mobile communication network pages the UE 205 only in cell-x between 10 AM and 2 PM, rather than in a range of cells as per usual paging procedure.

As another example, in response to the reported trend "Video streaming is used from 9 PM to 10 PM," the policy function 215 may address the trend by creating a new policy to optimize the streaming experience of the UE 205 between 9 PM and 10 PM. Such a policy may include a new QoS policy (e.g., applying higher scheduling priority to the UE 205) and/or invoke a video optimizer. The video streaming trend may be detected by analyzing packets of the UE 205 and/or by analyzing software application usage at the UE 205.

As another example, in response to the reported trend "On weekdays the location of the device follows the same path X," the policy function 215 may address the trend by predicting the location of the device (e.g., using the path X) and creating an appropriate paging policy (e.g., only paging using cells along the path X). In addition, the policy function 215 may address the trend by creating a network policy 240 to optimize mobility (e.g., handover) procedures among base units 110 located along the path X.

Figure 4:
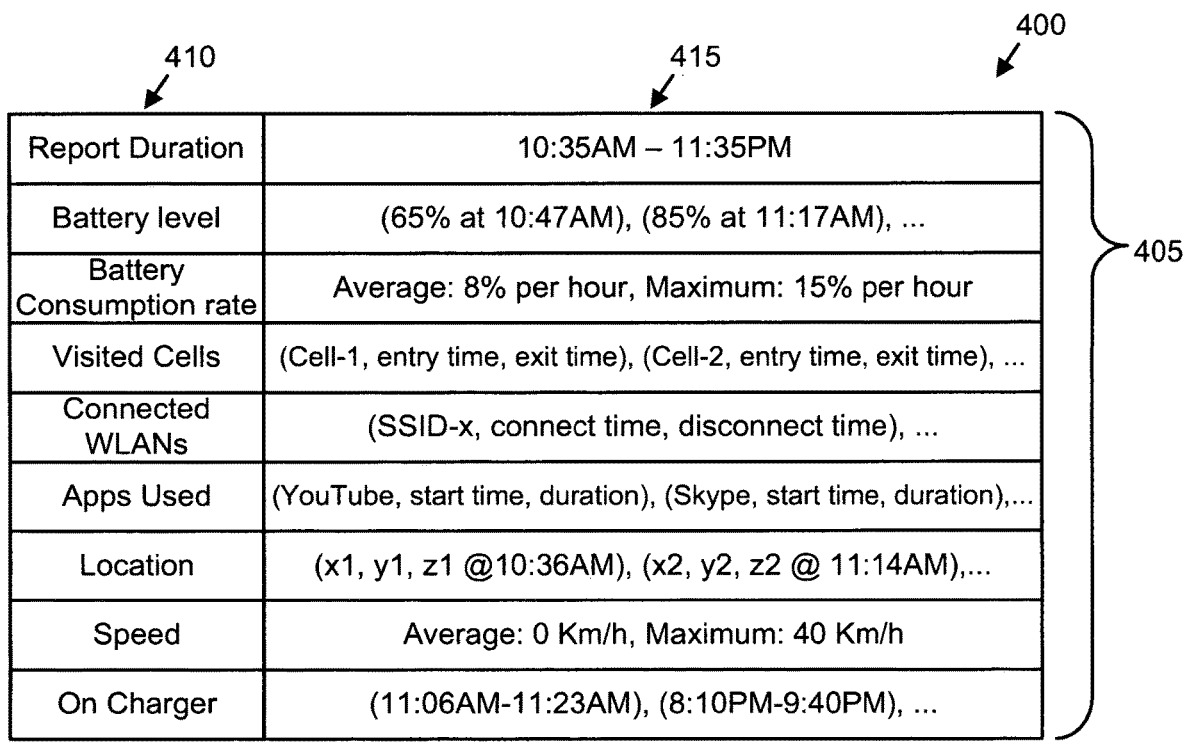
FIG. 4 illustrates one embodiment of a usage report for analytics-based policy generation.

FIG. 4 is a block diagram illustrating one example of a usage report 400 generated by a remote unit (e.g., the remote unit 105 and/or the UE 205), according to embodiments of the disclosure. The usage report 400 may be one embodiment of a usage report 225 discussed above with reference to FIG. 2-3. The usage report 400 includes usage data requested by the mobile communication network. For example, the policy framework 130 may initially request that the UE 205 collect particular usage data, as discussed above with reference to FIG. 3.

The usage report 400 includes a plurality of entries 405, each entry 405 reporting requested usage data. Each entry 405 includes a usage data type 410 and a data field 415. The usage report 400 is one illustration of a usage report for analytics-based policy generation, and is not to limit the scope of the disclosure. Other usage reports may include more or less usage data types, different formats, and different data values.

Here, the reported usage data types include a report duration (e.g., a reporting period), a battery level, a battery consumption rate, a list of visited cells, a list of connected WLANs, applications used, device location, device speed, and charging times (e.g., times on-charger). Here, the report duration is from 10:35 AM to 11:35 PM. The report duration may vary from one usage report 400 to another, e.g., based on the UE 205 meeting the conditions of the reporting policy.

The usage report 400 indicates battery levels at various points in time. Here, the battery level was 65% at 10:47 AM, 85% at 11:17 AM, etc. Note that the increase in battery level corresponds to a time on charger. The usage report may also include an average battery consumption rate (e.g., 8% per hour) and a maximum rate (e.g., 15% per hour). In some embodiments, the maximum battery consumption rate data may include a timestamp (not shown).

The usage report 400 lists cells visited (e.g., Cell-1, Cell-2, etc.). These cells are visited in idle mode and are otherwise not known to the network. The usage report 400 also indicated when each cell was entered and exited. The usage report 400 also lists WLAN connections during the reporting period, including an SSID, connection time, and disconnection time for each connected WLAN. The usage report 400 includes a list of applications used on the remote unit. Here the list includes an application identity (e.g., a YouTube application, a Skype application, etc.), start times and durations (alternatively, end times) for each application run on the remote unit during the reporting period.

The usage report also includes a list of device locations (e.g., sampled periodically) including coordinates (x-coordinate, y-coordinate, and z-coordinate) and timestamps. The usage report 400 also includes an average speed (e.g., 0 Km/h) and (optionally) a maximum speed (e.g., 40 Km/h). In some embodiments, the maximum speed data may include a timestamp (not shown). Finally, the usage report 400 also includes charging times (e.g., times on charger) including start times and end times (e.g., 11:06 AM-11:23 AM, 8:10 PM-9:40 PM, etc.).

Figure 5:
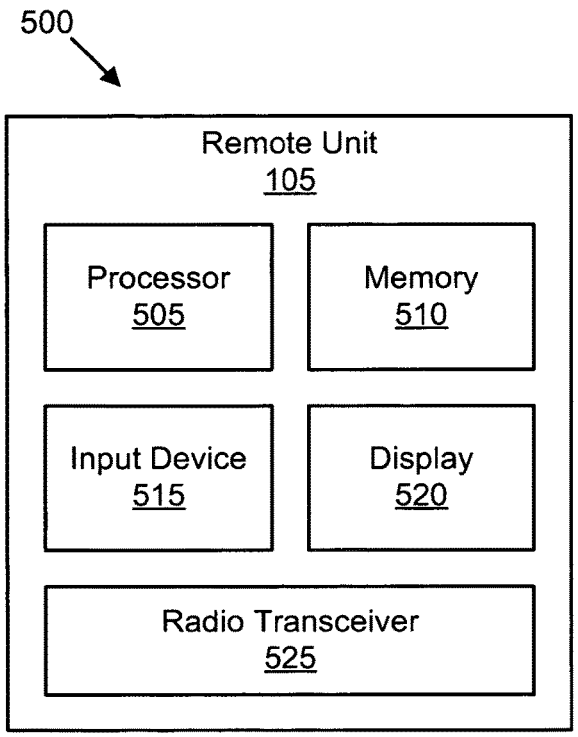
FIG. 5 is a schematic block diagram illustrating one embodiment of a computing device for analytics-based policy generation.

FIG. 5 depicts one embodiment of an apparatus 500 that may be used for analytics-based policy generation. The apparatus 500 includes one embodiment of the remote unit 105. Furthermore, the remote unit 105 may include a processor 505, a memory 510, an input device 515, a display 520, and a radio transceiver 525. In some embodiments, the input device 515 and the display 520 are combined into a single device, such as a touchscreen. In certain embodiments, the remote unit 105 may not include any input device 515 and/or display 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the radio transceiver 525.

In certain embodiments, the processor 505 may receive from the analytics function 210 (via the radio transceiver 525) a request to report usage data of at least one type of usage data according to a reporting policy. Usage data types may include battery usage data, network location data, application usage history, physical location data, and/or speed data. The received request instructs the processor 505 what kind of usage data to report and when to send the usage reports 225. Battery usage data may include battery level data, battery consumption rate data, and charging times. Network location data may include cells visited while the remote unit 105 is an idle mode and/or WLAN connection history.

The processor 505 then gathers usage data of the indicted usage data type(s), generates a usage report 225 containing the usage data, and transmits the usage report to the analytics function 210 according to the reporting policy. The processor 505 transmits usage data in batches, rather than in real-time. Requesting that a remote unit collect and transmit usage data according to a reporting policy is discussed above with reference to FIG. 3. An exemplary usage report is discussed above with reference to FIG. 4.

At some point in time, the processor 505 receives a network policy 240 from the policy function 215. As discussed above, the network policy 240 is dynamically generated by the policy framework 130 in response to trends and/or patterns identified from the transmitted usage data. In response to receiving a network policy 240, the processor 505 applies (e.g., implements) the network policy 240. Examples of network policies 240 include, but are not limited to, a routing policy, a QoS policy, a media codec policy, and the like. In certain embodiments, the network policy 240 has a validity period and the processor 505 applies the network policy 240 only during the validity period. Because the policy framework 130 dynamically generates new network policies 240 based on the usage data underlying newly identified trends, in some embodiments, a later provisioned network policy 240 may override an earlier provisioned network policy 240.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to analytics-based policy generation, for example a reporting policy, data collection parameters for one or more usage data types, usage data, network policies 240, and the like. In some embodiments, the memory 510 also stores program code and related data, such as an operating system or other controller algorithms operating on the remote unit 105 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The radio transceiver 525 communicates with a mobile communication network (e.g., a PLMN). The radio transceiver 525 comprises a transmitter used to provide UL communication signals to the base unit 110 and a receiver used to receive DL communication signals from the base unit 110. In one embodiment, the radio transceiver 525 is used to transmit usage reports 225 to the RAN 120. In another embodiment, the radio transceiver 525 is used to receive usage report requests and/or network policies from the policy framework 130 (via the RAN 120).

The radio transceiver 525 may include any suitable number of transmitters and receivers. In some embodiments, the radio transceiver 525 includes a plurality of transmitter and receiver pairs for communicating on a plurality of wireless networks and/or radio frequency bands. Each transmitter and receiver pair may communicate on a different wireless network and/or radio frequency band than other transmitter and receiver pairs.

Figure 6:
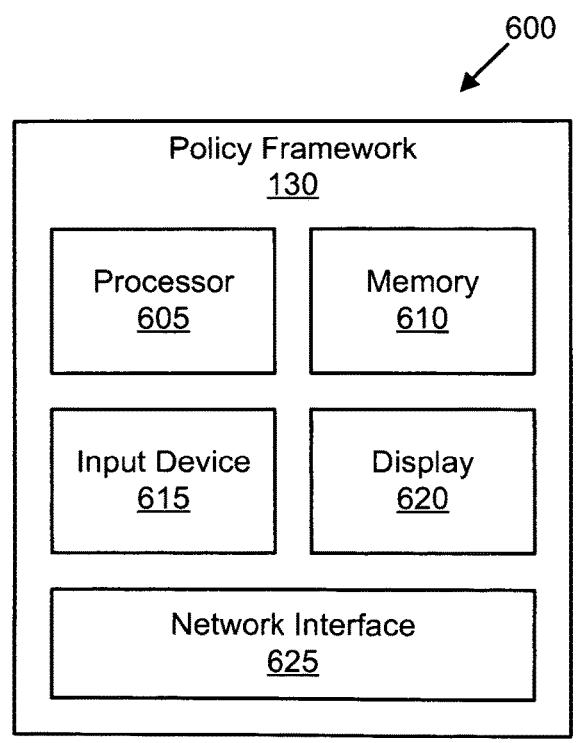
FIG. 6 is a schematic block diagram illustrating another embodiment of a computing device for analytics-based policy generation.

FIG. 6 depicts one embodiment of an apparatus 600 that may be used for analytics-based policy generation. The apparatus 600 includes one embodiment of the policy framework 130. Furthermore, the policy framework 130 may include a processor 605, a memory 610, an input device 615, a display 620, and a network interface 625. In some embodiments, the input device 615 and the display 620 are combined into a single device, such as a touchscreen. In certain embodiments, the remote unit 105 may not include any input device 615 and/or display 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the display 620, and the network interface 625. While depicted as a single unit, the processor 605 may include multiple physical processing units, processing cores, and/or logical processing units. Further, the multiple processing units of the processor 605 may be distributed geographically or collocated. In one embodiment, the processor 605 comprises one processing unit performing the functions of the analytics function 210, described above, and another processing unit performing the functions of the policy function 215, described above.

In certain embodiments, the processor 605 may request a remote unit 105 to report at least one type of usage data according to a reporting policy. As discussed above, the at least one type of usage data may include battery usage data and/or network location data. The processor 605 receives a usage report 225 from the remote unit 105. The usage report 225 includes usage data of the at least one type of usage data. The remote unit 105 transmits the usage report 225 according to the reporting policy. In some embodiments, the processor 605 stores the usage report 225 in the memory 610 as usage history. In certain embodiments, the processor 605 also receives a network report 230 for the remote unit 105.

The processor 605 determines an analytics record 235. The analytics record 235 indicates at least one trend based on usage data in the usage report 225 and includes a confidence level calculated for each trend. Where a network report 230 is received, the at least one trend may also be based on the network report 230. In response to the confidence level of a trend exceeding a predetermined threshold, the processor 605 dynamically generates a network policy 240 based on the usage data underlying the trend. Additionally, the processor 605 controls the network interface 625 to send the network policy 240 to the remote unit 105 and/or the network functions 220. The network policy 240 may be a quality of service policy, a routing policy, a paging policy, a media codec policy, and the like as discussed above with reference to FIGS. 2-4. The processor 605 may further request the remote unit 105 and/or the network functions 220 apply the network policy 240.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to analytics-based network policy generation, for example usage reports 225, network reports 230, analytics records 235, and network policies 240, as discussed above with reference to FIGS. 2 and 3. In some embodiments, the memory 610 also stores program code and related data, such as an operating system or other controller algorithms operating on the policy framework 130.

The input device 615 and the display 620 may be substantially similar to the input device 515 and the display 520 discussed above with reference to FIG. 5.

The network interface 625, in one embodiment, is configured to communicate with a remote unit 105 via the RAN 120. In another embodiment, the network interface 625 is also configured to communicate with one or more network elements in the mobile network core 125 and/or RAN 120.

In some embodiments, the network interface 625 receives a usage report 225 from a UE 205 and/or a network report 230 from a network function 220. In certain embodiments, the network interface 625 transmits network policies 240 to the UE 205 and/or network function 220.

In one embodiment, the network interface 625 includes a plurality of interfaces. For example, a first interface may be used to receive measurements (e.g., usage reports 225) from the UE 205, a second interface used to receive measurements (e.g., network reports 230) from network functions 220, a third interface used to provision network policies 240 to the UE 205, and a fourth interface used to provision network policies 240 to the network functions 220. Additionally, the network interface 625 may include an interface for communicating with other functions within the mobile network core 125. Where the analytics function 210 and the policy function 215 are separate entities within the policy framework 130, an internal interface may be present for communicating analytics records 235 from the analytics function 210 to the policy function 215, as discussed above with reference to FIGS. 2 and 3.

Figure 7:
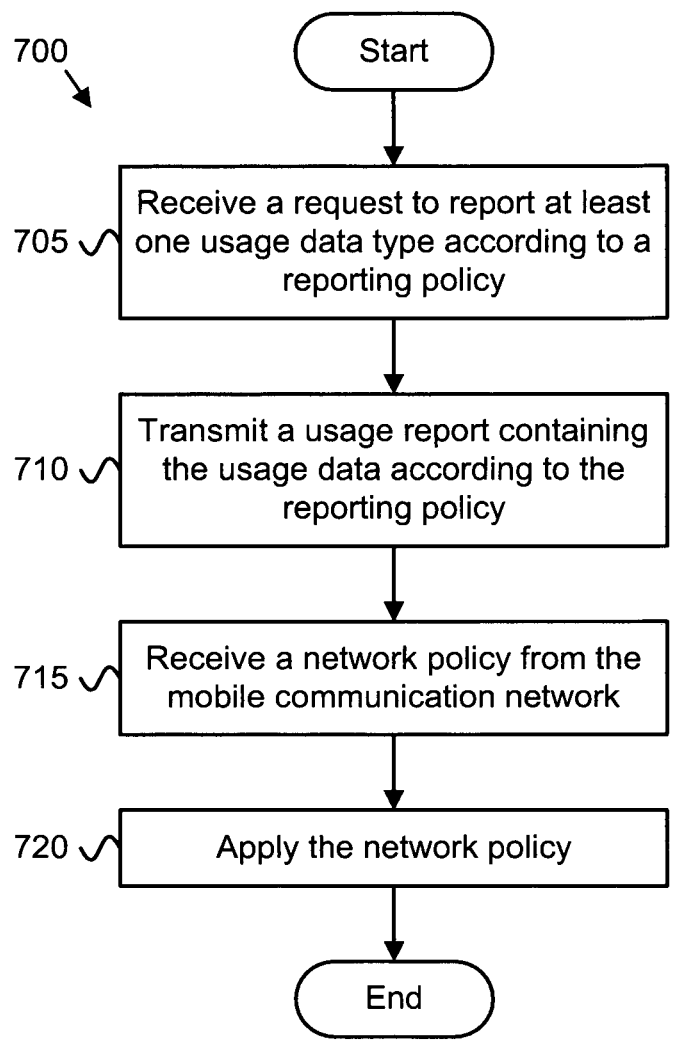
FIG. 7 is a schematic flow chart diagram illustrating one embodiment of a method for analytics-based policy generation.

FIG. 7 is a schematic flow chart diagram illustrating one embodiment of a method 700 for analytics-based policy generation, according to embodiments of the disclosure. In some embodiments, the method 700 is performed by an apparatus, such as the remote unit 105, UE 205, or apparatus 500. In certain embodiments, the method 700 may be performed by a processor executing program code, for example, a microcontroller, a microprocessor, a CPU, a GPU, an auxiliary processing unit, a FPGA, or the like.

The method 700 may include receiving 705 a request to report at least one type of usage data according to reporting policy. In one embodiment, the processor 505 receives 705 the request via the radio transceiver 525. The at least one type of usage data includes battery usage data and/or network location data. The reporting policy indicates when a remote unit is to transmit a usage report 225. The reporting policy may define one or more conditions to be met in order for the remote unit to transmit the usage report 225. The one or more conditions may include a charging state of the remote unit 105 (e.g., only transmit usage reports 225 at regular intervals when the remote unit is on a charger and not on battery power), a battery level of the remote unit 105 (e.g., only transmit usages report 225 at regular intervals when battery levels are above a threshold amount), a network connection type of the remote unit 105 (e.g., only transmit usage reports 225 at regular intervals when connected to a WLAN), a usage report size (e.g., only transmit a usage report 225 when the usage report 225 reaches X size), and expiration of a predetermined time interval (e.g., transmit a usage report 225 at regular intervals).

The method 700 includes transmitting 710 a usage report 225 containing the usage data according to the reporting policy. In one embodiment, the processor 505 controls the radio transceiver 525 to transmit 710 the usage report 225. In another embodiment, the processor 505 transmits 710 usage data in batches (e.g., compiled in a usage report 225), rather than transmitting real-time reports. An exemplary usage report is discussed above with reference to FIG. 4.

The method 700 includes receiving 715 a network policy 240 from the mobile communication network (e.g., by the policy framework 130). In one embodiment, the processor 505 receives 715 the network policy via the radio transceiver 525. The network policy is dynamically generated by the mobile communication network (e.g., by the policy framework 130) corresponding to at least one trend identified in the usage data received in the usage report 225. In some embodiments, the network policy 240 may be a quality of service policy, a routing policy, a media codec policy, or the like. The method 700 includes applying 720 the network policy 240. The method 700 ends. In certain embodiments, the network policy 240 has a validity period, wherein applying 720 the network policy 240 comprises applying the network policy 240 during the validity period.

Figure 8:
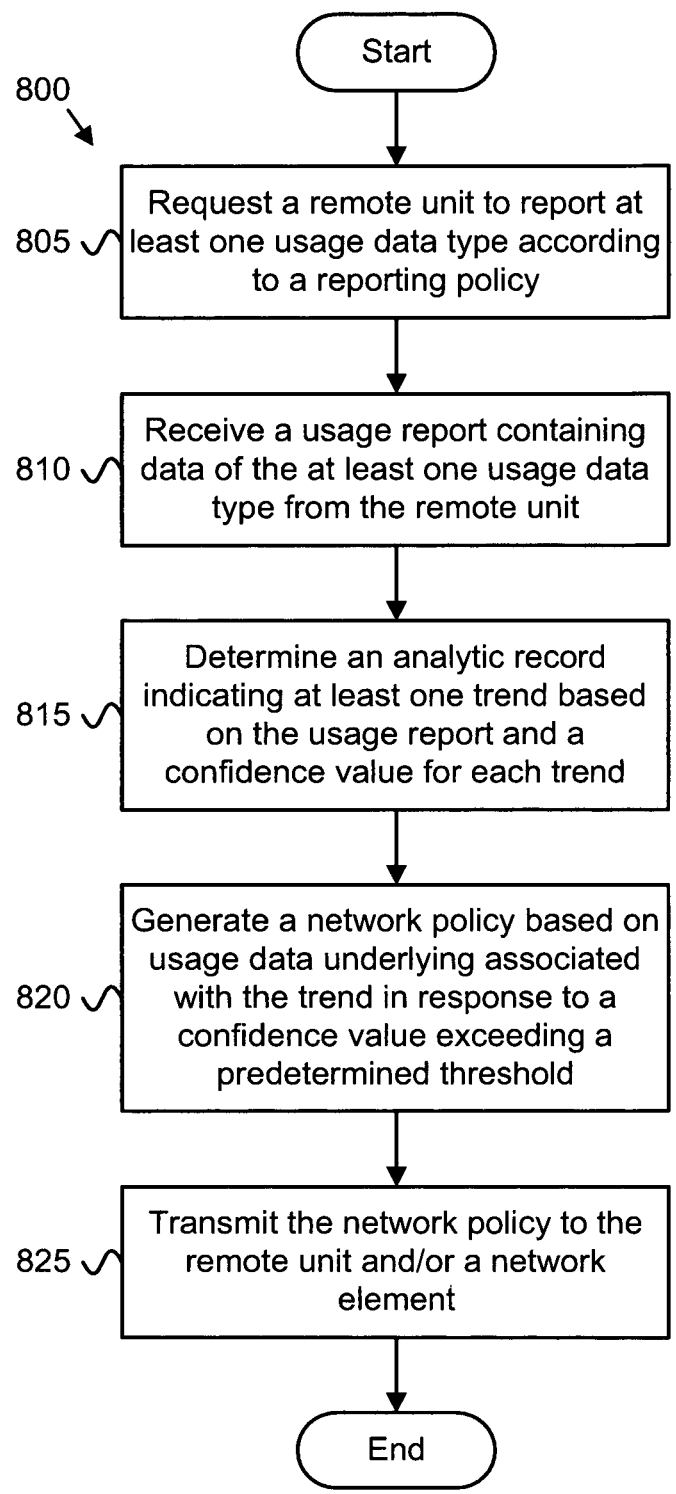
FIG. 8 is a schematic flow chart diagram illustrating another embodiment of a method for analytics-based policy generation.

FIG. 8 is a schematic flow chart diagram illustrating one embodiment of a method 800 for analytics-based policy generation, according to embodiments of the disclosure. In some embodiments, the method 800 is performed by an apparatus, such as the policy framework 130 or apparatus 600. In certain embodiments, the method 800 may be performed by a processor executing program code, for example, a microcontroller, a microprocessor, a CPU, a GPU, an auxiliary processing unit, a FPGA, or the like.

The method 800 may include requesting 805 a remote unit to report at least one type of usage data according to a reporting policy. In one embodiment, the processor 605 controls the network interface 625 to request 805 the remote unit 105 to collect specific types of usage data type and report the usage data according to a reporting policy. The at least one type of usage data may include battery usage data and/or network location data. The reporting policy indicates one or more conditions to be met for the remote unit to transmit collected usage data.

The method 800 includes receiving 810 from the remote unit a usage report 225 containing usage data of the at least one type of usage data. In one embodiment, the processor 605 receives 810 the usage report 225 from the remote unit via the network interface 625. In some embodiments, receiving 810 the usage report 225 includes receiving usage data in batches, rather than receiving real-time reports. An exemplary usage report is discussed above with reference to FIG. 4.

The method 800 includes determining 815 an analytics record 235, the analytics record 235 indicating at least one trend based on the usage report 225 and a confidence level for each trend. In one embodiment, the processor 605 determines 815 the analytics record 235 and calculates a confidence level for each trend. In some embodiments, the analytics record 235 is a user-specific analytic report generated by the analytics function 210. In other embodiments, the analytics record 235 is a network-specific analytic report generated by the analytics function 210. Examples of analytics records 235 are discussed above with reference to FIG. 3.

The method 800 includes generating 820 a network policy 240 based on the usage data underlying the trend in response to a confidence level of the trend exceeding a predetermined threshold. In one embodiment, the processor 605 generates 820 the network policy 240, where the network policy 240 addresses an identified trend having a confidence level that exceeds the predetermined threshold. In some embodiments, the network policy 240 may be a quality of service policy, a routing policy, a paging policy, and/or a media codec policy.

The method 800 includes transmitting 825 the network policy 240 to the remote unit 105 and/or a network function 220. In one embodiment, the processor 605 controls the network interface 625 to transmit 825 the network policy 240 to the remote unit 105 and/or the network function 220. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
configuring a user equipment (UE) with a reporting policy to report at least one type of usage data, the at least one type of usage data comprising network location data, power usage data, and application usage data, wherein the reporting policy comprises at least one condition to be met;
receiving a usage report from the UE, the usage report comprising network location usage data, power usage data, and application usage data, the network location data comprising a list of cells visited while in an idle mode, a wireless local area network connection history, or some combination thereof, the power usage data comprising a set of battery state levels and corresponding timestamps, and the application usage data indicating software applications used by the UE and corresponding timestamps;
determining an analytics record for the UE, wherein the analytics record indicates at least one trend based on the usage report and wherein the analytics record indicates a confidence level for each of the at least one trend, wherein the at least one trend indicates a pattern of movement of the UE for a particular time period, a pattern of power usage for the particular time period, and a pattern of application usage for the particular time period;
generating a network policy in response to the confidence level of at least one trend exceeding a predetermined threshold, the network policy being based on usage data underlying the at least one trend, wherein the network policy indicates a paging policy to be utilized at the particular time period; and
transmitting the network policy to one of the UE and a network function.

2. The method of claim 1, further comprising receiving a network report for the UE, wherein the analytics record for the UE further indicates at least one trend based on the network report.

3. The method of claim 2, wherein network report comprises data selected from the group consisting of: handover history of the UE, traffic type history, and data consumption history of the UE.

4. The method of claim 1, further comprising storing received usage reports as usage history at a storage device, wherein determining an analytics record for the UE is further based on the stored usage history.

5. The method of claim 1, wherein the at least one indicated trend indicates a pattern of battery consumption at the particular time period.

6. The method of claim 5, wherein the network policy indicates a quality of service policy, a routing policy, a media codec to be utilized at the particular time period, or some combination thereof.

7. The method of claim 1, wherein the at least one trend indicates a pattern of media streaming in the particular time period and the network policy indicates a quality of service to be utilized at the particular time period.

8. The method of claim 1, wherein the reporting policy indicates whether the UE is to transmit a usage report based on a charging state of the UE, a battery level of the UE, a network connection type of the UE, a usage report size, a predetermined time interval, or some combination thereof.

9. A user equipment (UE) for wireless communication, comprising:
   at least one memory; and
   at least one processor coupled with the at least one memory and configured to cause the UE to:
   receive a reporting policy from a mobile communication network to report at least one type of usage data, the at least one type of usage data comprising network location data, power usage data, and application usage data, wherein the reporting policy comprises a reporting condition to be met;
   determine that the reporting condition in the reporting policy is met;
   transmit a usage report in response to the reporting condition being met, the usage report containing network location usage data, power usage data, and application usage data based on the reporting policy,
      wherein the network location usage data comprises a list of cells visited while in an idle mode, a wireless local area network connection history, or some combination thereof,
      wherein the power usage data comprises a set of battery levels and corresponding timestamps, and
      wherein the application usage data indicates software applications used by the UE and corresponding timestamps;
   receive a network policy from the mobile communication network, the network policy being dynamically generated by the mobile communication network based on at least one trend identified in usage data contained in the usage report,
      wherein the at least one trend indicates a pattern of movement of the UE for a particular time period, a pattern of power usage for the particular time period, and a pattern of application usage for the particular time period, and
      wherein the network policy indicates a paging policy and to be utilized at the particular time period; and
   apply the network policy.

10. A method performed by a user equipment (UE), the method comprising:
   receiving, by the UE, a request from a mobile communication network to report at least one type of usage data according to a reporting policy, the at least one type of usage data comprising network location data, power usage data, and application usage data, wherein the reporting policy comprises a reporting condition to be met;
   determining that the reporting condition in the reporting policy is met;
   transmitting, by the UE and based on the reporting policy, a usage report in response to the reporting condition being met, the usage report containing network location usage data, power usage data, and application usage data,
      wherein the network location usage data comprises a list of cells visited while in an idle mode, a wireless local area network connection history, or some combination thereof,
      wherein the power usage data comprises a set of battery levels and corresponding timestamps, and
      wherein the application usage data indicates software applications used by the UE and corresponding timestamps;
   receiving, by the UE, a network policy from the mobile communication network, the network policy being dynamically generated by the mobile communication network based on at least one trend identified in usage data contained in the usage report,
      wherein the at least one trend is a pattern of movement of the UE for a particular time period, a pattern of power usage for the particular time period, and a pattern of application usage for the particular time period, and
      wherein the network policy indicates a paging policy to be utilized at the particular time period; and
   applying, by the UE, the network policy.

11. The method of claim 10, wherein the reporting policy indicates whether the UE is to transmit a usage report based on a charging state of the UE, a battery level of the UE, a network connection type of the UE, a usage report size, a predetermined time interval, or some combination thereof.

12. The method of claim 10, wherein the power usage data includes battery level data, power consumption rate data, and charging history.

13. The method of claim 10, wherein the at least one identified trend is a pattern of battery consumption at the particular time period.

14. The method of claim 13, wherein the network policy indicates a quality of service policy, a routing policy, a media codec to be utilized at the particular time period, or some combination thereof.

15. The method of claim 10, wherein the network policy comprises a routing policy that indicates a base unit to connect with at the particular time period.

16. The method of claim 10, wherein the at least one identified trend is a pattern of media streaming at the particular time period and the network policy indicates a quality of service to be utilized at the particular time period.

17. The method of claim 10, wherein the network policy has a validity period, wherein applying the network policy comprises applying the network policy during the validity period.

18. A system comprising:
   a first network function that:
      configures a user equipment (UE) with a reporting policy to report at least one type of usage data, the at least one type of usage data comprising network location data, power usage data, and application usage data, wherein the reporting policy comprises at least one condition to be met;
      receives a usage report from the UE, the usage report comprising network location usage data, power usage data, and application usage data, the network location data comprising a list of cells visited while in an idle mode, and a wireless local area network connection history, or some combination thereof, the power usage data comprising a set of battery levels and corresponding timestamps, and the application usage data indicating software applications used by the UE and corresponding timestamps; and
      determines an analytics record for the UE, wherein the analytics record indicates at least one trend based on the usage report and wherein the analytics record indicates a confidence level for each of the at least one trend, wherein the at least one trend indicates a pattern of movement of the UE for a particular time period, a pattern of power usage for the particular time period, or a pattern of application usage for the particular time period; and
   a second network function that:
      dynamically generates a network policy in response to the confidence level of at least one trend exceeding a predetermined threshold, the network policy being based on usage data underlying the at least one trend, wherein the network policy indicates a paging policy to be utilized at the particular time period; and sends the network policy to one of the UE and a network function.

19. The method of claim 1, wherein the network policy further indicates a mobility management policy to be utilized at the particular time period.

20. The method of claim 10, wherein the network policy further indicates a mobility management policy to be utilized at the particular time period.

* * * * *